United States Patent [19]

Sheets

[11] Patent Number: 4,513,373
[45] Date of Patent: Apr. 23, 1985

[54] LOCAL AREA NETWORK

[75] Inventor: Duane R. Sheets, Garland, Tex.

[73] Assignee: Electronic Data Systems Corporation, Dallas, Tex.

[21] Appl. No.: 454,054

[22] Filed: Dec. 28, 1982

[51] Int. Cl.³ .............................................. G06F 1/00
[52] U.S. Cl. ................................................... 364/200
[58] Field of Search ... 364/200 MS File, 900 MS File

[56] References Cited

U.S. PATENT DOCUMENTS 4,177,511 12/1979 Taddei .............................. 364/200

OTHER PUBLICATIONS

"Micro600 PortSelector User's Manual", Micom Systems, Inc., Mar. 1982.
"1076 Owner's Manual", Protocol Computers, Inc., Copyright 1982.

Primary Examiner—Raulfe B. Zache
Attorney, Agent, or Firm—Richards, Harris, Medlock & Andrews

[57] ABSTRACT

A local area network (10) includes a communications switch multi-port selector (12) which functions as the hub of the network. There are connected to the selector (12) various types of stations (14, 16) and terminals (18, 20, 22 and 24) which utilize a common communication format such as ASCII. The network further includes a computer (52) which uses a communication format that is incompatible with the stations and terminals connected to the port selector (12). Protocol converters (30, 32, 34 and 36) are connected between the port selector (12) and the computer (52) to provide translation between the communication formats of the computer (52) and the various stations (14, 16) and terminals (18, 20, 22, 24). A computer (54) is further provided which is connected to the port selector (12) and utilizes the communication format of the stations and terminals. The network (10) thus provides the capability for a substantial number of conventional stations and terminals to communicate with a preexisting computer system in a flexible and inexpensive manner despite the incompatibility of the communication formats.

5 Claims, 1 Drawing Figure

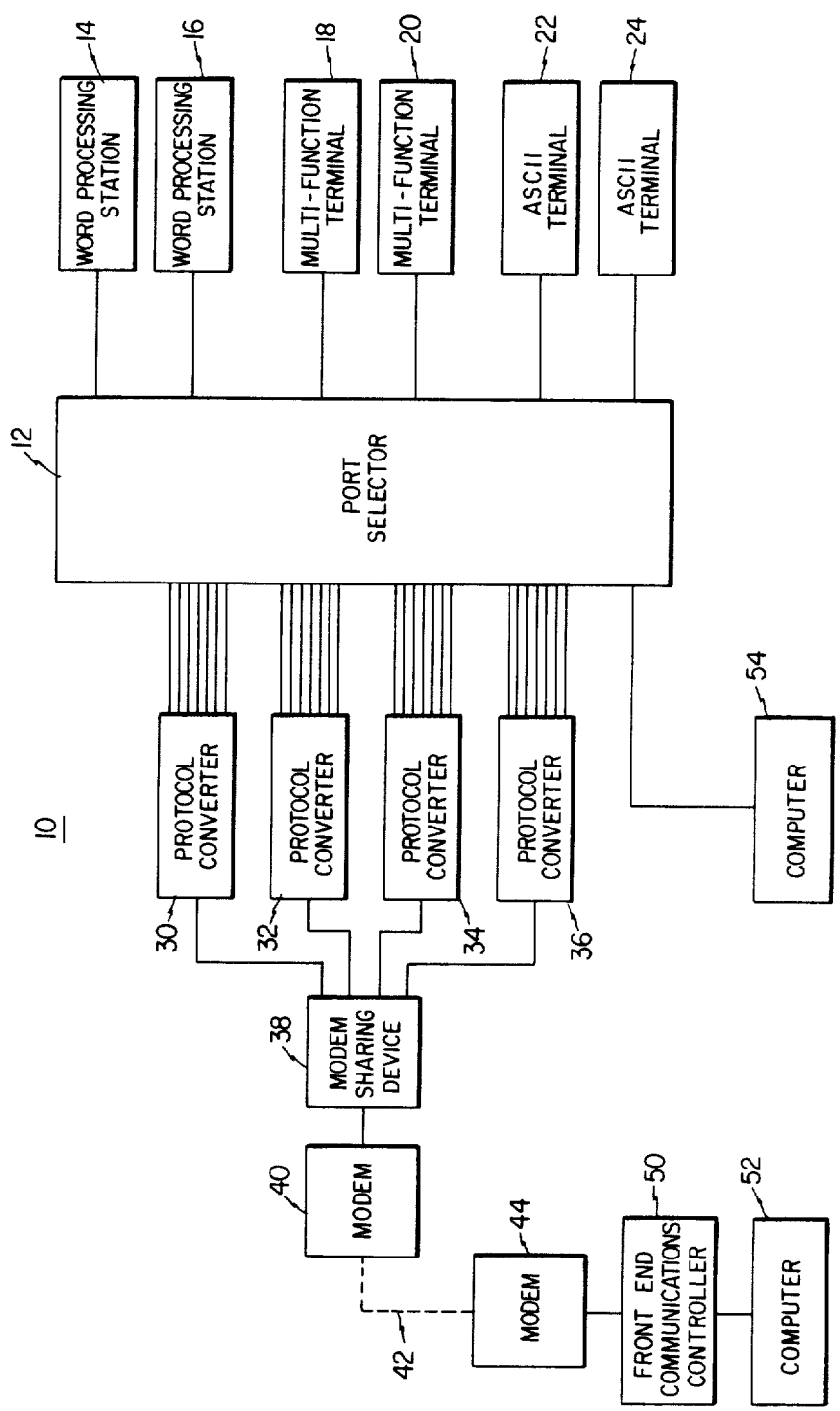

LOCAL AREA NETWORK

TECHNICAL FIELD

The present invention pertains in general to electronic communication systems and pertains more particularly to a multi-terminal local communication network.

BACKGROUND OF THE INVENTION

There is a strong technological trend towards the automation of activities which are carried out in business offices. This trend has resulted in the development of word processing stations, electronic typewriters and computerized work terminals. As greater hardware and software has developed, it has become possible for individuals to be much more productive in their individual jobs. It has, however, become apparent that a productive office environment requires substantial communication between the people working in the office as well as the capability of referencing stored data and communicating through data networks across long distances.

In response to this new communication requirement, there have been numerous proposals offered for implementing local area networks. The design of such networks is made difficult due to the existence of incompatible communication formats used by various types of office equipment including computers, the wide variety and types of terminal work stations and the complexity in providing the large number of communication paths required between a substantial number of end terminals.

In view of the above problems regarding communication in the office environment, there exists a need for a local area network which can provide communication between a plurality of dissimilar terminals and can communicate with computer systems using incompatible formats.

SUMMARY OF THE INVENTION

A selected embodiment of the present invention comprises a local area network having a plurality of input/output terminals which transmit and receive data by use of a first communication format. A multi-port communication switch has a plurality of its ports connected respectively to the input/output terminals wherein the switch can connect any one of the terminals to any other of the terminals or to other ports of the switch. Apparatus is provided for converting data between the first communication format and a second communication format with the apparatus being connected to at least one of the ports of the switch. A computer is provided which transmits and receives data by use of the second communication format. A coupling apparatus provides a connection between the apparatus for converting communication formats and the computer wherein any one of the input/output terminals can be connected through the switch to communicate with the computer.

DESCRIPTION OF THE DRAWING

For a more complete understanding of the present invention and the advantages thereof, reference is now made to the following Description taken in conjunction with the accompanying Drawing in which the FIGURE is a block diagram illustrating the local area network of the present invention.

DETAILED DESCRIPTION

Referring now to the FIGURE there is illustrated a network 10 which provides communication between a plurality of terminals as well as access to computer systems. The hub of the network comprises a port selector 12 which has a plurality of ports which can be interconnected in any desired configuration. The port selector 12 is a communication switch. A selected embodiment of the port selector 12 is a model Micro 600 which is manufactured by MICOM SYSTEMS, INC. located in Chatsworth, Calif.

A plurality of input/output terminals are connected to the port selector 12. These terminals include word processing stations 14 and 16. The stations 14 and 16 communicate by use of the ASCII (American Standard Code for Information Interchange) format. A selected embodiment of the word processing stations 14 and 16 is a model 2001E+2002 manufactured by Philips Information Systems.

Further connected to the port selector 12 are multifunction terminals 18 and 20, which are commonly referred to as "smart" terminals. An example of such a terminal is a model IBM Personal Computer manufactured by IBM Corporation.

ASCII terminals 22 and 24 are connected to the port selector 12. The terminals 22 and 24 are commonly termed "dumb" terminals. An example of the terminals 22 and 24 are a model VT100 manufactured by Digital Equipment Corporation.

The stations 14 and 16, along with the terminals 18, 20, 22 and 24, each utilizes the ASCII communication format for data communication.

The port selector 12 has a capability of connecting any one of its ports to any other one of its ports. Through this capability any one of the stations 14 and 16 or terminals 18, 20, 22 and 24 can be connected to any other of the stations or terminals. This provides a communication capability between the various terminals.

A plurality of protocol converters 30, 32, 34 and 36 are connected to respective ports of the port selector 12. A selected embodiment of the protocol converters 30, 32, 34 and 36 is a model 1076 manufactured by Protocol Computers, Inc. of Woodland Hills, Calif. In the present embodiment the converters 30, 32, 34 and 36 provide a translation between the ASCII communication format and a widely used format termed SNA/SDLC (System Network Architecture/Synchronous Data Link Control). This format is used primarily with equipment manufactured by IBM Corporation. These two communication formats are not compatible with each other. However, the protocol converters 30, 32, 34 and 36 provide a translation between the two communication formats.

The SNA/SDLC terminals of the converters 30, 32, 34 and 36 are connected to a modem sharing device 38. Optionally the BSC/SDLC (Bi-Synchronous Communications/Synchronous Data Link Control) terminals of the conveters 30, 32, 34 and 36 can be connected to the modem sharing device 38. An example of the modem sharing device 38 is a Model MSD94A or B manufactured by Racal Milgo. The device 38 is further connected to a modem 40. The modem 40 is connected through a communication link 42 to a modem 44.

A front end communications controller 50 is connected to the modem 44 and operates to provide the communication function for a computer 52. An example of the controller 50 is a Model 4705 manufactured by AMDAHL. A representative embodiment of the computer 52 is a model 3083 manufactured by IBM Corporation. The computer 52 communicates by use of the SNA/SDLC communication format.

The network 10 further includes a computer 54 which is connected directly to one of the ports of the port selector 12. A representative embodiment of the computer 54 is a model VAX 11/780 manufactured by Digital Equipment Corporation. The computer 54 communicates by use of the ASCII communication format and can therefore communicate directly through the port selector 12 with any one of the stations 14 and 16 or the terminals 18, 20, 22 and 24.

The network 10 described in the FIGURE is operational as described provided the stations and terminals as well as the converters and computer 54 are located at relatively short distances from the port selector 12. When it is desired to remote the terminals or stations at greater distances from the port selector 12, there can be installed appropriate modems as are well known in the art. The computer 54 can likewise be located at any remote distance by use of a modem for communication with the port selector 12. With the stations and terminals located at relatively short distances from the port selector 12, up to approximately 500 feet, the stations, terminals and port selector can be interconnected by the use of standard four-wire telephone line. Thus, the network 10 can be easily set up in an office where such telephone lines have previously been installed. This can substantially reduce the installation expense for the network 10.

The operation of the local area network 10 is now described in reference to the FIGURE. A principal application of the network 10 is to provide an automated information system for a business office. The word processing stations 14 and 16 can operate as independent units separate from the network 10. However, they also have the capability of functioning as communication terminals to provide such functions as data access and retrieval and electronic mail. The stations 14 and 16 can command the port selector 12 to connect the station through one of the protocol converters 30, 32, 34 and 36 to the computer 52. The computer 52 can then provide a response which permits the operator to select a particular application program or to review a data base.

Further operational capabilities are that the computer 52 can function as a node in a telecommunications network such that the stations 14 and 16 for example, can enter the telecommunication network through the computer 52. Thus, by being connected into the local area network 10 the stations 14 and 16 can be used in a wide variety of functions beyond the single word processing application as an independent station.

The multi-function terminals 18 and 20 have the capability of providing data processing independent of the network 10. But like the terminals 14 and 16, they can also provide communication to other stations and stations as well as accessing the computers 52 and 54.

The terminals 22 and 24 typically have no independent operational capability but operate strictly to provide input and output to the network 10. The terminals 22 and 24 can communicate with other terminals and stations in the network 10 as well as providing the same access to the computers 52 and 54. The terminals 22 and 24 are typically inexpensive such that a substantial number of such terminals can be provided in the network 10.

In summary, the present invention comprises a local area network in which a wide variety of conventional stations and terminals, which utilize a standard communication format, can be connected into a network which further includes a computer system that operates in a noncompatible communication format. Protocol converters are included to translate between the terminal communication format and a computer communication format. A port selector comprises the hub of the network and makes it possible for any of the stations or terminals to communicate with other stations or terminals as well as to computers which have incompatible formats or compatible formats.

Although one embodiment of the invention has been illustrated in the accompanying Drawings and described in the foregoing Detailed Description, it will be understood that the invention is not limited to the embodiments disclosed, but is capable of numerous rearrangements, modifications and substitutions of parts and elements without departing from the scope of the invention.

I claim:

1. A local area network, comprising:
   a plurality of input/output terminals which transmit and receive data by use of a first communication format,
   a multi-port communication switch having a plurality of ports thereof connected respectively to said input/output terminals wherein said switch can connect any one of said terminals to any other of said terminals or to other ports of said switch thereof,
   means for converting data between said first communication format and a second communication format, said means for converting connected to at least one of said ports of said switch,
   a computer which transmits and receives data by use of said second communication format, and
   means for coupling said means for converting to said computer wherein any one of said input/output terminals can be connected through said switch to communicate with said computer.

2. A local area network as recited in claim 1 including a second computer which transmits and receives data by use of said first communication format and said second computer is coupled to one of the ports of said switch wherein any one of said input/output terminals can communicate through said switch to said second computer.

3. A local area network as recited in claim 1 wherein said means for coupling comprises:
   first and second modems connected respectively to said means for converting and said computer, and
   a communications link connecting said first and second modems.

4. A local area network as recited in claim 1 wherein said first communication format is ASCII and said second communication format is SNA/SDCC.

5. A local area network as recited in claim 1 wherein said first communication format is ASCII and said second communication format is BSC/SDLC.

* * * * *